(12) United States Patent
Sato

(10) Patent No.: US 6,727,432 B2
(45) Date of Patent: Apr. 27, 2004

(54) GROMMET

(75) Inventor: Hidetoshi Sato, Susono (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/301,763

(22) Filed: Nov. 22, 2002

(65) Prior Publication Data

US 2003/0098171 A1 May 29, 2003

(30) Foreign Application Priority Data

Nov. 29, 2001 (JP) ...................................... P2001-364342

(51) Int. Cl.[7] ................................................. H02G 1/00

(52) U.S. Cl. ................................ 174/65 G; 174/153 G; 227/55; 29/623.2; 16/2

(58) Field of Search .......................... 174/65 G, 153 G; 227/55; 29/623.2; 16/2

(56) References Cited

U.S. PATENT DOCUMENTS 5,150,602 A * 9/1992 Payne et al. .............. 29/623.2
5,353,472 A * 10/1994 Benda et al. ................. 16/2.2
5,856,635 A * 1/1999 Fujisawa et al. ........ 174/153 G

FOREIGN PATENT DOCUMENTS

JP         8-140246      5/1996
JP         08-140246   * 5/1996     ............... 174/65 G

* cited by examiner

Primary Examiner—Dean A. Reichard
Assistant Examiner—Anton Harris
(74) Attorney, Agent, or Firm—Sughrue Mion, PLLC

(57) ABSTRACT

A grommet includes a first cylindrical portion for passing a member threthrough and a second cylindrical portion connected to the first cylindrical portion through an annular connection portion formed at an outer peripheral face of the first cylindrical portion. The second cylindrical portion has a fitting groove which formed in an outer peripheral face thereof for fitting on an inner peripheral edge of a through hole in a mounting plate. A first junction portion is formed between the annular connection portion and the first cylindrical portion. A second junction portion is formed between the annular connection portion and the second cylindrical portion. A form of the grommet changes between a first state in which an angle formed the annular connection portion with the first cylindrical portion in cross section is an acute angle and a second state in which an angle formed the annular connection portion with the first cylindrical portion in cross section is obtuse angle. At least one of the first cylindrical portion and the second cylindrical portion are formed so that the grommet autonomously restores in the first state.

5 Claims, 3 Drawing Sheets

1 grommet 3 through hole 4 wire harness (long member)

5 mounting portion 6 wire harness-fixing portion (long member-fixing portion)

7 closure portion 16 first junction portion 17 second junction portion

GROMMET

BACKGROUND OF THE INVENTION

This invention relates to a grommet for passing and holding a member, such as a wire harness, relative to a through hole in a mounting plate of an vehicle or the like.

Many wire harnesses are installed, for example, on a vehicle body of an automobile, and among these wire harnesses, there are some each passed through a through hole in a vehicle body panel. When the wire harness is passed through the through hole, the wire harness contacts a peripheral edge of the through hole during the running of the automobile, so that a sheath (insulating material) of the wire harness may be damaged, and besides rain water, dust and others may intrude into a car room through a gap between the wire harness and the peripheral edge of the through hole. Therefore, a grommet, made of an elastic material such as rubber, is mounted in the through hole so that the wire harness will not contact the peripheral edge of the through hole, and the grommet closes the gap between the wire harness and the peripheral edge of the through hole. There are known grommets of various shapes, and one example is disclosed in JP-A-8-140246.

As shown in FIG. 4, this grommet includes a cylindrical mounting portion 22, having an engagement groove 21 which is formed in an outer peripheral face thereof, and can be fitted in an inner peripheral edge portion of a through hole 20, a cylindrical wire harness-fixing portion 24, which can be fitted on and fixed to a wire harness 23, and a closure portion 25 closing a space between the mounting portion 22 and the wire harness-fixing portion 24, these portions 22, 24 and 25 being formed or molded integrally with one another. The closure portion 25 has a cylindrical shape gradually decreasing in diameter, and is disposed within the mounting portion 22. Namely, a larger-diameter portion (one end portion) of the closure portion 25 is connected to the mounting portion 22 while a smaller-diameter portion (the other end portion) thereof is connected to one end of the wire harness-fixing portion 24, and the mounting portion 22, the closure portion 25 and the wire harness-fixing portion 24 are interconnected to assume a generally Z-shaped cross-section, so that the wire harness 23, even when fixed to the grommet 26 (that is, to the wire harness-fixing portion 24), can be bent and moved.

When mounting operation of this grommet 26 in the through hole 20 is performed, the wire harness 23 is fixed to the wire harness-fixing portion 24, and in this condition the wire harness 23, passing through the through hole 20, or the wire harness-fixing portion 24 is pulled in its longitudinal direction, that is, in a direction from the other end of the closure portion 25 to the one end thereof. As a result, the wire harness-fixing portion 24 is moved along the length of the wire harness 23. At this time, the smaller-diameter portion of the closure portion 25 is moved along the length of the wire harness 23, and this smaller-diameter portion of the closure portion 25 is moved forwardly beyond the position, at which the larger-diameter portion thereof is connected to the mounting portion 22, in the direction of pulling of the wire harness 23, and the grommet 26 is first formed, for example, into a funnel-like shape as shown in FIG. 5, and then the mounting portion 22 is pulled toward the through hole. Then, that side of an outer peripheral portion of the mounting portion 22, held in contact with the peripheral edge portion of the through hole 20, is pressed and deformed to be forced into the through hole 20, so that the peripheral edge portion of the through hole 20 is engaged in the engagement groove 21, thus effecting the mounting of the grommet 26 in the through hole 20.

When mounting operation of the above grommet in a through hole 20 in a vehicle body panel is performed, the wire harness-fixing portion 24 or the wire harness 23 is pulled, thereby forcing the one side of the mounting portion 22 into the through hole through the closure portion 25. When the mounting portion 22 is pulled, the grommet is formed into the funnel-like shape as shown in FIG. 5. Namely, before this pulling operation, the other end portion of the closure portion 25 is disposed rearwardly of the one end portion thereof in the pulling direction, and when the pulling operation is effected, the other end portion is moved into the position disposed forwardly of the one end portion in the pulling direction, so that the closure portion is held in its extended condition. Therefore, after mounting the grommet 26 in the through hole 20, the closure portion 25 of the grommet 26, in some cases, remains in the extended condition. In this case, for restoring the closure portion 25 (that is; the grommet 26) into its original shape, the wire harness-fixing portion 24 and the wire harness 23 must be moved in a direction opposite to the above moving direction by man power, and therefore the efficiency of the operation is low.

SUMMARY OF THE INVENTION

It is therefore an object of the present invention to provide a grommet which can be mounted efficiently.

In order to achieve the above object, according to the present invention, there is provided a grommet comprising:

a first cylindrical portion for passing a member threthrough;

a second cylindrical portion, connected to the first cylindrical portion through an annular connection portion formed at an outer peripheral face of the first cylindrical portion, the second cylindrical portion having a fitting groove which formed in an outer peripheral face thereof for fitting on an inner peripheral edge of a through hole in a mounting plate;

a first junction portion, formed between the annular connection portion and the first cylindrical portion; and a second junction portion, formed between the annular connection portion and the second cylindrical portion;

wherein a form of the grommet changes between a first state in which an angle formed the annular connection portion with the first cylindrical portion in cross section is an acute angle and a second state in which an angle formed the annular connection portion with the first cylindrical portion in cross section is obtuse angle; and wherein at least one of the first cylindrical portion and the second cylindrical portion are formed so that the grommet autonomously restores in the first state.

Preferably, the first junction portion is positioned at inside of the second cylindrical portion in the first state. The first junction portion is positioned at outside of the second cylindrical portion in the second state.

Preferably, the first junction portion has a thickness in an axial direction of the first cylindrical portion larger than a thickness of the annular connection portion.

Preferably, the first junction portion has a thickness in an axial direction of the first cylindrical portion larger than a thickness of the first cylindrical portion.

Preferably, the second junction portion has a thickness in an axial direction of the first cylindrical portion larger than a thickness of the annular connection portion.

In this construction, the first and second junction portion have the increased stiffness, and have an increased force acting to or tending to restore itself into the first shape. Therefore, even when the grommet is extended, it is restored into the first shape either by itself or merely by applying a small force thereto, and therefore the efficiency of the operation is enhanced.

Preferably, a thickness portion is formed over a periphery of at least one of the first junction portion and the second junction portion.

In this configuration, at least one of the first junction portion and the second junction portion are increased in thickness of the entire periphery thereof, the stiffness of at least one of the first junction portion and the second junction portion is surely increased, and therefore mounting operation of the grommet can be effected efficiently.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE PREFERRED EMBODIMENTS

A preferred embodiment of the present invention will now be described in detail with reference to the drawings.

Figure 1:
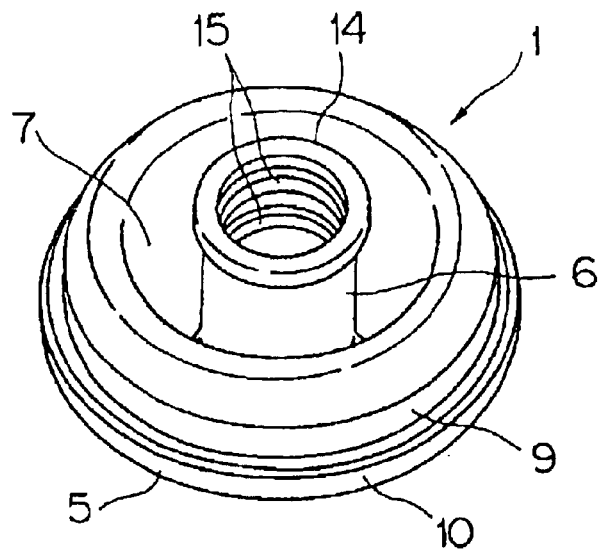
FIG. 1 is perspective view of one preferred embodiment of a grommet of the present invention.
Figure 2:
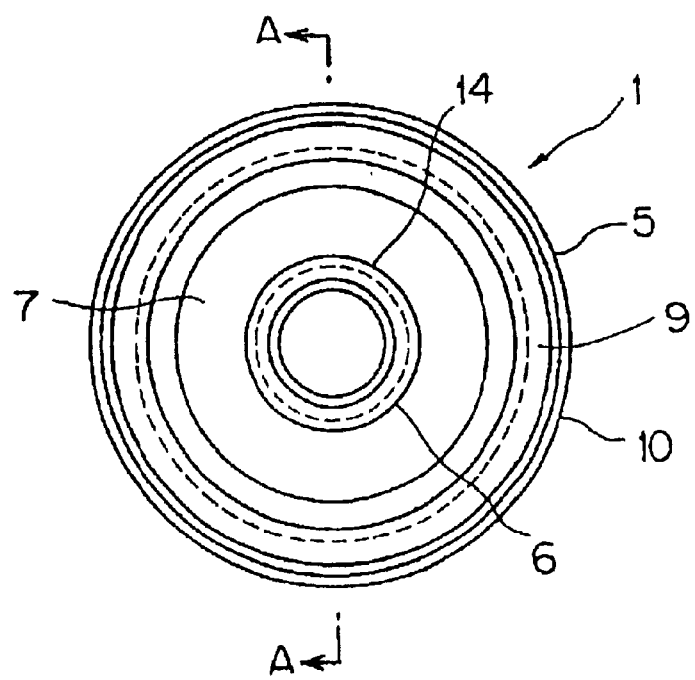
FIG. 2 is a front-elevational view of the grommet of the invention.
Figure 3:
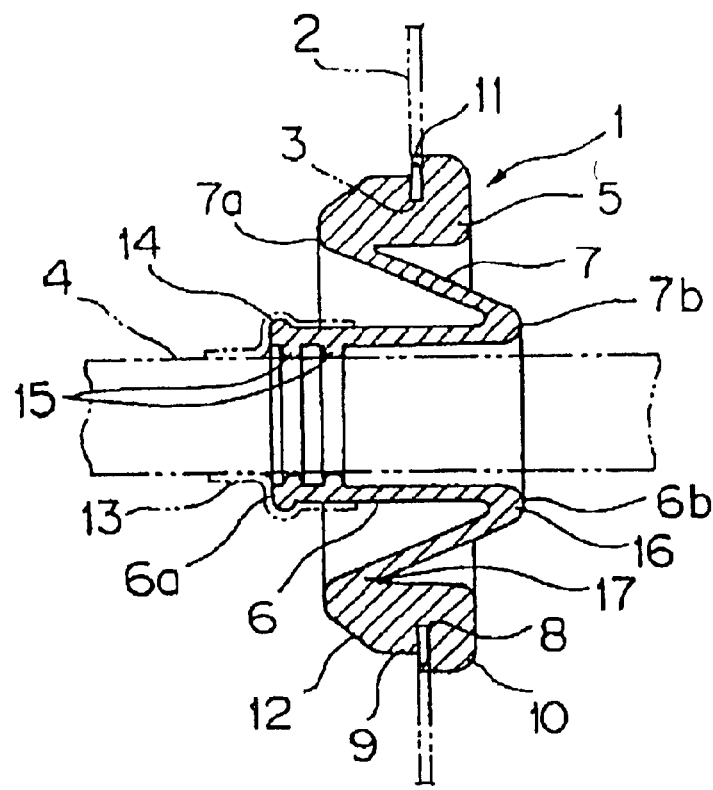
FIG. 3 is a cross-sectional view taken along the line A—A of FIG. 2.
Figure 4:
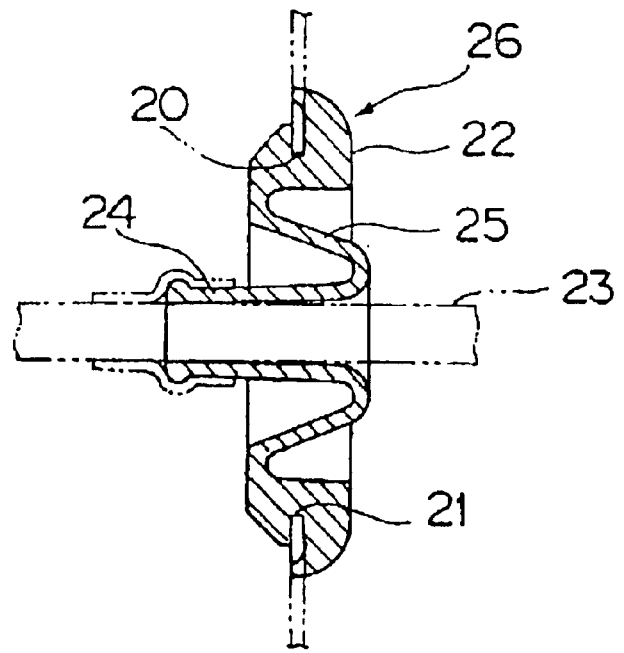
FIG. 4 is a cross-sectional view of a related grommet.

FIGS. 1 to 3 show one preferred embodiment of a grommet of the invention. In FIGS. 1 to 3, the grommet 1 serves to protect a long member (such as a wire harness 4 passed through a through hole 3 in a vehicle body panel 2 of an automobile or the like) from a peripheral edge of the through hole 3, and also serves-to prevent rain water, dust and others from intruding into a car room through a gap between the wire harness 4 and the peripheral edge of the through hole 3.

The grommet 1 includes a mounting portion 5 for engagement in the through hole 3 in the vehicle body panel 2, a tubular wire harness-fixing portion (long member-fixing portion) 6 for fitting on the wire harness 4, passing through the mounting portion 5, and a tubular closure portion 7, closing a space between the mounting portion 5 and the wire harness-fixing portion 6, these portions 5, 6 and 7 being formed or molded integrally with one another, using a rubber-type elastic material (such as EPDM, CR or NBR) or the like.

The mounting portion 5 has a cylindrical shape, and its outer diameter is larger than the diameter of the through hole 3, and its inner diameter is smaller than the diameter of the through hole 3. An engagement groove 8, having, for example, a channel-shaped cross-section, is formed in an outer peripheral face of the mounting portion 5 over the entire circumference thereof, and is disposed generally centrally of the thickness of the mounting portion. The peripheral edge portion of the through hole 3 can be engaged in the engagement groove 8, and preferably the diameter of a bottom face of the engagement groove 8 is substantially equal to or slightly larger than the diameter of the through hole 3. Preferably, a width of the engagement groove 8 is substantially equal to or slightly smaller than a thickness of the vehicle body panel 2 through which the through hole 3 is formed.

The outer peripheral face of the mounting portion 5 is divided by the engagement groove 8 into an insertion portion 9 and an abutment portion 10. The outer diameter and shape of the abutment portion 10 are formed so that this abutment portion 10 can not be inserted into the through hole 3. A peripheral rib 11 is formed at an outer peripheral edge of that face of the abutment portion 10 forming, together with the insertion portion, the engagement groove 8, and projects in a direction toward the groove. When the peripheral edge portion of the through hole 3 is engaged in the engagement groove 8, the rib 11 is held in contact with the vehicle body panel 2 to form a seal between the mounting portion 5 and the vehicle body panel 2.

The insertion portion 9 is larger in diameter than the through hole 3, and has such outer diameter and shape that this insertion portion 9 can be pressed and elastically deformed to be inserted into the through hole 3. A tapering portion 12 is formed at a peripheral edge of that side (or end) of the insertion portion 9, facing away from the engagement groove 8, so as to facilitate the insertion of the insertion portion 9 into the through hole 3, and preferably the outer diameter of this end portion is slightly larger than the diameter of the engagement groove 8.

The wire harness-fixing portion 6 can be inserted into the mounting portion 5, and has a cylindrical shape, and has an outer diameter slightly larger than the outer diameter of the wire harness 4. A peripheral ridge 14 is formed on an outer peripheral face of the wire harness-fixing portion 6 at one end thereof (that end disposed close to the insertion portion), and when a winding member, such as a tape 13, is wound on the wire harness-fixing portion 6 and the wire harness 4 to fix the wire harness-fixing portion 6 to the wire harness 4, the ridge 14 serves to prevent the tape 13 from being displaced out of position. A pair of radially inwardly-projecting ridges 15 are formed separately each other on an inner peripheral face of the wire harness-fixing portion 6, and are disposed adjacent to the one end thereof.

The closure portion 7 closes the space between the mounting portion 5 and the wire harness-fixing portion 6, and is formed into a cylindrical shape gradually decreasing in diameter. One end (larger-diameter portion) 7a of the closure portion 7 is connected to the inner peripheral face of the mounting portion 5 while the other end (smaller-diameter portion) 7b is connected to the outer peripheral face of the wire harness-fixing portion 6. More specifically, the mounting portion 5, the closure portion 7 and the wire harness-fixing portion 6 are disposed generally on a common axis, and that end portion of the mounting portion 5 (defined by the insertion portion 9) and the larger-diameter portion 7a of the closure portion 7 are interconnected, while the smaller-diameter portion 7b and the other end portion 6b of the wire harness-fixing portion 6 are interconnected, so that the three portions 5, 7 and 6 assume a generally Z-shaped cross-section, and with this construction the wire harness 4, even when fixed to the grommet 1 (that is, to the wire harness-fixing portion 6), can be bent and moved.

In FIG. 3, although that portion of the mounting portion 5, to which the larger-diameter portion 7a is connected, is the insertion portion-side end portion of the inner peripheral face of the mounting portion 5, this connecting portion is not limited to it, but may be a central portion, the abutment portion-side end portion or other portion. In FIG. 3, although that portion of the wire harness-fixing portion 6, to which the smaller-diameter portion 7b is connected, is the other end portion 6b of the wire harness-fixing portion, this connecting portion is not limited to it, but may be a central portion, the one end portion or other portion.

Although the closure portion 7 and the wire harness-fixing portion 6 may be equal to or different from each other in thickness, it is preferred that an junction portion (first junction portion) 16, at which the closure portion 7 and the wire harness-fixing portion 6 are interconnected, should be larger in thickness than the closure portion 7 and the wire harness-fixing portion 6 as shown in the drawings. When the first junction portion 16 is made larger in thickness than the closure portion 7 and the wire harness-fixing portion 6, the stiffness increases, and therefore preferably (though not absolutely necessary), the first junction portion 16 has such a thickness as to enable the restoration of the grommet 1 as described below. More specifically, the wire harness-fixing portion 6, fixed to the wire harness 4, is moved in a direction from the other end 6b thereof toward the one end 6a thereof, and when the angle of interconnection of the closure portion 7 and the wire harness-fixing portion 6 is changed from an acute angle to an obtuse angle, this movement is stopped (For example, in the case where the wire harness-fixing portion 6 is grasped with the hand, and is pulled, the operator releases his hold of the wire harness-fixing portion 6), and as a result the wire harness-fixing portion 6 is moved in a direction from the one end 6a thereof toward the other end 6b thereof, so that the grommet 1 is restored into its original shape.

Preferably, a junction portion (second junction portion) 17, at which the closure portion 7 and the mounting portion 5 are interconnected, should be larger in thickness than the closure portion 7. When the second junction portion 17 is made larger in thickness than the closure portion 7, the stiffness increases, and therefore preferably (though not absolutely necessary), the second junction portion 17 has such a thickness as to enable the restoration of the grommet 1 as described below. More specifically, the wire harness-fixing portion 6, fixed to the wire harness 4, is moved in the direction from the other end 6b thereof toward the one end 6a thereof, and when the angle of interconnection of the closure portion 7 and the mounting portion 5 is changed from an acute angle to an obtuse angle, this movement is stopped (for example, in the case where the wire harness-fixing portion 6 is grasped with the hand, and is pulled, the operator releases his hold of the wire harness-fixing portion 6), and as a result the wire harness-fixing portion 6 is moved in the direction from the one end 6a thereof toward the other end 6b thereof, so that the grommet 1 is restored into its original shape.

For mounting this grommet 1, for example, in the through hole 3 in the vehicle body panel 2, first, the wire harness 4 is passed through the wire harness-fixing portion 6, and the grommet 1 is moved into a predetermined position on the wire harness 4. After the grommet is thus moved, the winding member, such as the tape 13, is wound on the outer periphery of the one end portion of the wire harness-fixing portion 6 and the outer periphery of the wire harness 4, thereby fixing the wire harness-fixing portion 6 to the wire harness 4, so that the grommet 1 is fixed to the wire harness 4. At this time, if the wire harness-fixing portion 6 is disposed within the closure portion 7, the closure portion 7 makes the winding of the tape 13 difficult. However, the wire harness-fixing portion 6 can be moved in the direction from the one end thereof toward the other end thereof, and therefore by pulling the wire harness-fixing portion 6 out of the closure portion 6, the tape can be wound without being interfered by the closure portion 7.

After the wire harness-fixing portion 6 and the wire harness 4 are fixed together, the wire harness 4, extending from the wire harness-fixing portion 6, is passed through the through hole 3, and the grommet 1, fixedly secured to the wire harness 4 by the tape 13, is located near to the through hole 3. There may be used a method in which the wire harness 4 is beforehand passed through the through hole 3, and in this condition the wire harness-fixing portion 6 and the wire harness 4 are fixed together.

Figure 5:
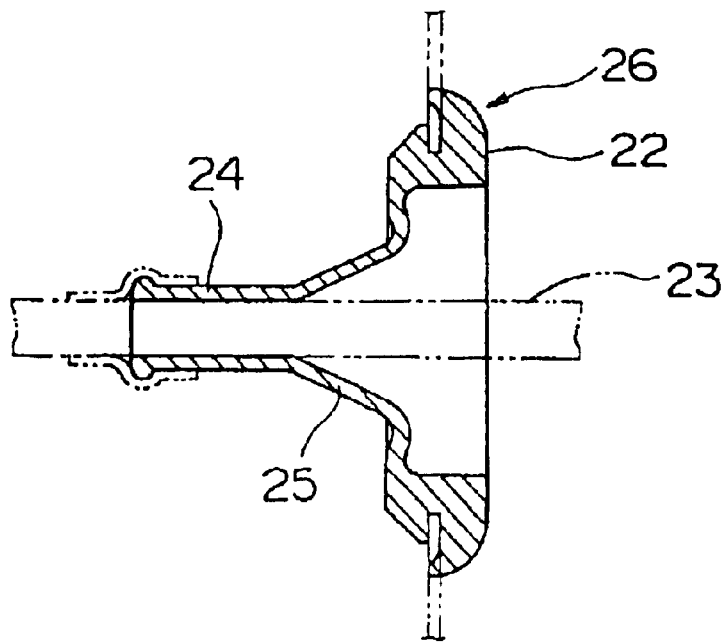
FIG. 5 is a cross-sectional view of the related grommet, showing a condition in which a closure portion is extended.

Then, the distal end of the insertion portion 9 of the mounting portion 5 of the grommet 1 (that is, the distal end of the tapering portion 12) is abutted against the peripheral edge portion of the through hole 3, and in this condition one or both of the wire harness 4 and the wire harness-fixing portion 6 are pulled in the direction away from the through hole 3, for example, in the direction from the other end of the wire harness-fixing portion 6 toward the one end thereof. As a result, the distal end of the insertion portion 9 (that is, the distal end of the tapering portion 12) is pressed against the peripheral edge portion of the through hole 3, and at the same time the wire harness-fixing portion 6 is moved in the direction of the length of the wire harness 4. This is achieved since the smaller-diameter portion 7b of the closure portion 7 is moved in the direction of the length of the wire harness 4. Thus, the smaller-diameter portion 7b of the closure portion 7 is moved forwardly beyond the position, at which the larger-diameter portion 7a thereof is connected to the mounting portion 5, in the direction of pulling of the wire harness 4, so that the grommet 1 is formed into a funnel-like shape (see FIG. 5).

When the pulling is further effected in this extended condition of the grommet 1, the distal end of the insertion portion 9 is pressed against the peripheral edge portion of the through hole 3, and is deformed to be forced into the through hole 3, so that the peripheral edge portion of the through hole 3 is engaged in the engagement groove 8. At this time, that side of the abutment portion 10, facing away from the engagement groove 8, may be pushed or pressed in the direction toward the engagement groove 8, and by doing so, the insertion of the insertion portion 9 into the through hole 3 can be effected easily.

When the peripheral edge portion of the through hole 3 becomes engaged in the engagement groove 8, the peripheral rib 11, projecting from the inner side or face of the abutment portion 10, is pressed against the vehicle body panel 2, having the through hole 3, and is elastically deformed (deformed under pressure) to be held in intimate contact with the vehicle body panel 2, thereby forming a seal between the mounting portion 5 and the vehicle body panel 2.

Thus, the insertion portion 9 is completely inserted into the through hole 3, so that the peripheral edge portion of the through hole 3 is engaged in the engagement groove 8, thereby mounting the grommet 1 in the through hole 3. Then, the pulling of the wire harness 4 or the wire harness-fixing portion 6 is stopped. For example, in the case where the wire harness 4 or the wire harness-fixing portion 6 is grasped with the hand, and is pulled, the operator releases his hold of it. The first junction portion 16 and/or the second junction portion 17 have the increased thickness, and therefore even when the closure portion 7 is in its extended condition, with the smaller-diameter portion 7b disposed forwardly of the larger-diameter portion 7a in the above moving direction, the junction portion 16, 17 has an increased force tending to restore itself into the original shape, since the junction portion 16, 17 has the increased stiffness. Therefore, even when the grommet 1 is extended, it is restored into the original shape either by itself or merely by applying a small force thereto, and therefore the mounting of the grommet 1 in the through hole 3 can be effected efficiently.

Although it is preferred that both of the first and second junction portions 16 and 17 be increased in thickness, one of the two may have the increased thickness, in which case it is preferred that the first junction portion 16 be increased in thickness.

If the thickness of the first and second junction portions 16 and 17 is so determined that the grommet 1 in its extended condition can be autonomously restored into the original shape, the grommet 1 is autonomously restored into the original shape when the pulling operation is stopped, and therefore the efficiency of the operation is further enhanced.

In the case where each of the first and second junction portions 16 and 17 is increased in thickness over the entire periphery thereof, the stiffness of the junction portions 16 and 17 is surely increased, so that the mounting of the grommet 1 can be effected efficiently.

In the grommet 1 of the present invention, the first junction portion 16 and/or the second junction portion 17 are increased in thickness, and therefore even when the grommet 1 is extended, the junction portion 16, 17 has the increased force acting to or tending to restore itself into the original force since the junction portion 16, 17 has the increased stiffness, and therefore the mounting of the grommet 1 in the through hole 3 can be effected efficiently. And besides, the grommet 1 can not be easily deformed since the first junction portion 16 and/or the second junction portion 17 are increased in thickness, and therefore the grommet 1 is held in the predetermined shape, and the grommet 1 is enhanced in appearance and quality.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. A grommet, comprising:

a first cylindrical portion for passing a member therethrough;

a second cylindrical portion, connected to the first cylindrical portion through an annular connection portion formed at an outer peripheral face of the first cylindrical portion, the second cylindrical portion having a fitting groove formed in an outer peripheral face thereof for fitting on an inner peripheral edge of a through hole in a mounting plate;

a first junction portion, formed between the annular connection portion and the first cylindrical portion; and a second junction portion, formed between the annular connection portion and the second cylindrical portion;

wherein a form of the grommet changes between a first state in which an angle formed by the annular connection portion with the first cylindrical portion in cross section is an acute angle and a second state in which an angle formed by the annular connection portion with the first cylindrical portion in cross section is an obtuse angle; and wherein at least one of the first cylindrical portion and the second cylindrical portion are formed so that the grommet autonomously restores in the first state, and wherein the first junction portion has a thickness in an axial direction of the first cylindrical portion larger than a thickness of the annular connection portion.

2. The grommet as set forth in claim 1, wherein the first junction portion is positioned at inside of the second cylindrical portion in the first state; and wherein the first junction portion is positioned at outside of the second cylindrical portion in the second state.

3. The grommet as set forth in claim 1, wherein the first junction portion has a thickness in an axial direction of the first cylindrical portion larger than a thickness of the first cylindrical portion.

4. The grommet as set forth in claim 1, wherein the second junction portion has a thickness in an axial direction of the first cylindrical portion larger than a thickness of the annular connection portion.

5. The grommet as set forth in claim 1, wherein a thickness portion is formed over a periphery of at least one of the first junction portion and the second junction portion.

* * * * *